INVENTOR.
WILLIAM J. POPOWSKY.

April 23, 1957  W. J. POPOWSKY  2,789,543
STABILIZED PNEUMATIC REGULATOR APPARATUS
Filed July 2, 1953  2 Sheets-Sheet 2
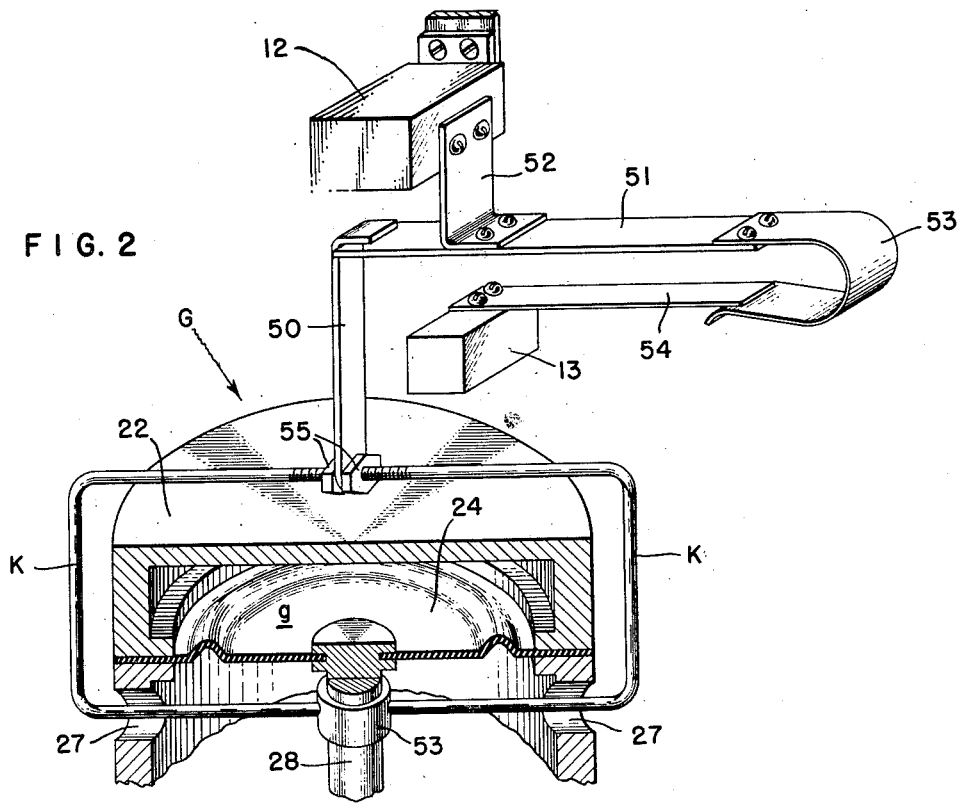
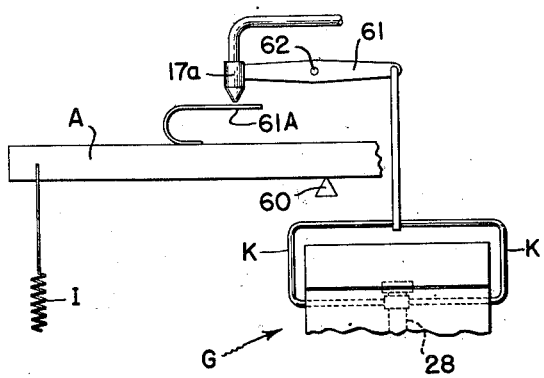
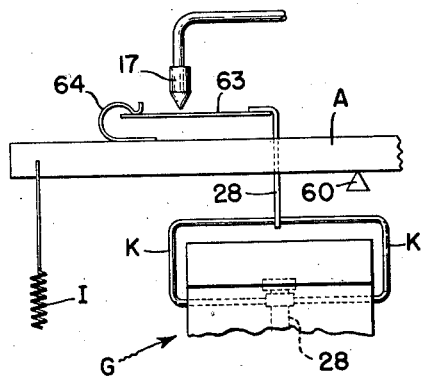
INVENTOR.
WILLIAM J. POPOWSKY
ATTORNEY.

United States Patent Office 2,789,543
Patented Apr. 23, 1957

2,789,543

STABILIZED PNEUMATIC REGULATOR APPARATUS

William J. Popowsky, Philadelphia, Pa., assignor to Minneapolis-Honeywell Regulator Company, Minneapolis, Minn., a corporation of Delaware Application July 2, 1953, Serial No. 365,757

7 Claims. (Cl. 121—41)

The present invention relates to electro-pneumatic device positioning apparatus. A primary object of the invention is to provide a highly stabilized electro-pneumatic device positioner. A more specific object of the invention is to provide a valve positioner characterized by its novel and effective means, actuated directly by a movable element of the pilot valve, for subjecting mechanism controlling the pilot valve to a feed back action.

Certain types of device positioners, particularly valve positioners of the so-called force balanced type, are subject to instability when the positioner is made highly sensitive. One such type of valve positioner is the electro-pneumatic positioner which receives an input electrical signal which is converted into a proportional pneumatic pressure. In that positioner the converting apparatus may take the form of an electric coil which creates a force acting on a beam, which force is balanced by a force proportional to output valve position. A pneumatic pressure is created by the beam motion and is amplified by the use, for example, of a pneumatic pilot valve in order to increase the utility and air handling capacity of the apparatus so that large pneumatic valves may be actuated. The addition of a pilot relay also increases the overall sensitivity. The pneumatic valves to be actuated contain a large amount of mass so that the inertia of this mass may be sufficient, when large changes are made with a fast time response, to cause the valve to move beyond the desired position and thus create a hunting or cycling of the valve as well as the elements of the valve positioner. Such a cycling condition is undesirable, and in accordance with the present invention, is prevented by the use of novel means to anticipate the valve position and the changes in its position. More specifically, the apparatus of the present invention relies for its operation upon the discovery that a motion in the pilot valve may be used to indicate the rate at which the valve is being adjusted and this motion may be used to create a stabilizing feed back force on the principal pressure producing beam.

It is therefore a further more specific object of the present invention to provide a stabilized pneumatic valve positioner which is force balanced by the motion of the valve and a motion taken from a pneumatic relay.

Still another more specific object of the present invention is the provision of an electro-pneumatic device positioner where a force created by an input current signal is balanced by a force from a device position responsive means and a pilot relay position responsive means.

The various features of novelty which characterize my invention are pointed out with particularity in the claims annexed to and forming a part of this specification. However, for a better understanding of the invention, its advantages, and specific objects attained with its use, reference should be had to the accompanying drawings and descriptive matter in which I have illustrated and described preferred embodiments of the invention.

Of the drawings:

Fig. 2 illustrates a modified form of a pilot valve feed back arrangement; and

Figs. 3 and 4 represent different modifications of the nozzle assembly shown in Fig. 1.

Figure 1:
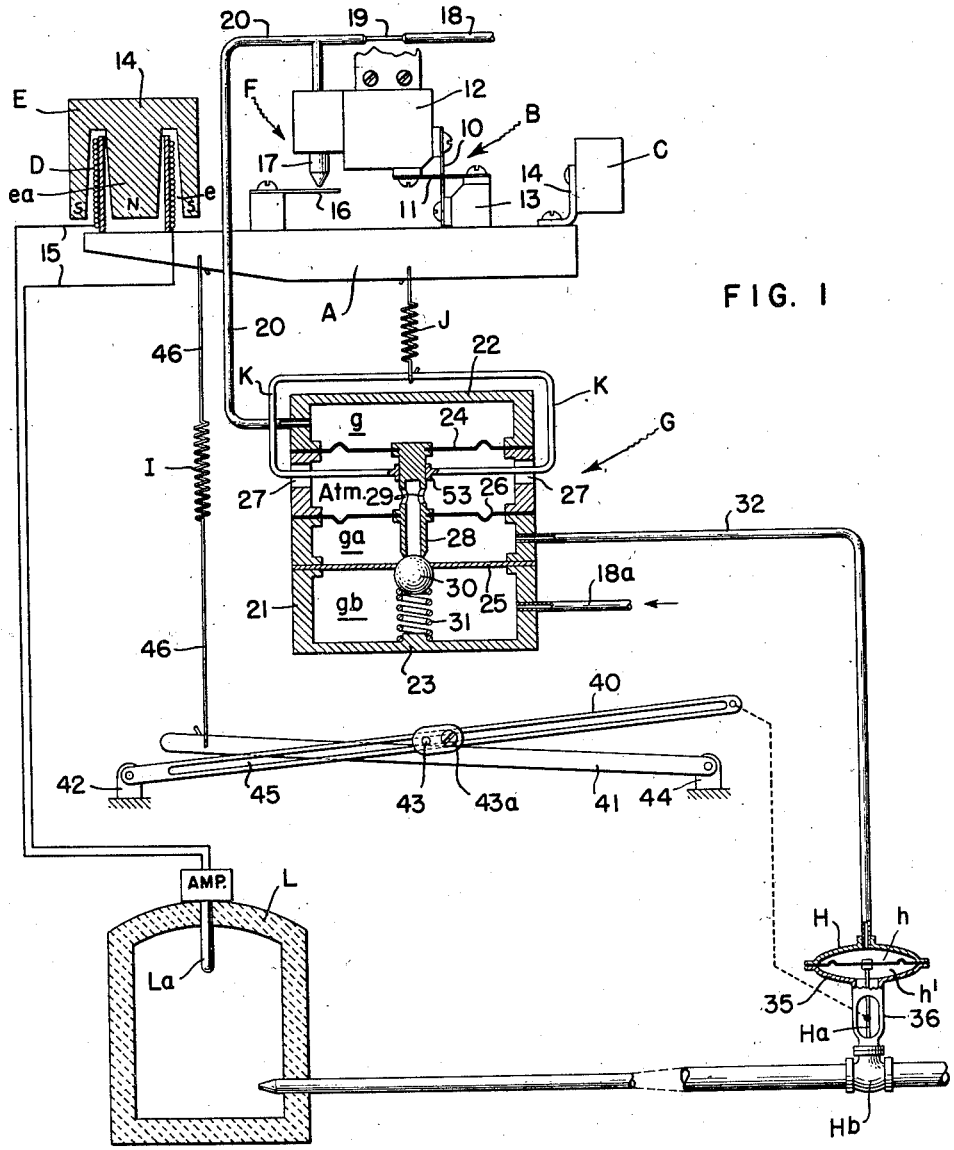
Fig. 1 is a diagrammatic illustration of a stabilized direct current valve positioner embodying the present invention.

The embodiment of the invention illustrated by way of example in Fig. 1, comprises an elongated beam A pivoted intermediate its ends to turn about the horizontal axis of a pivot B. As shown, the beam A carries a counterbalance C at one end and at the other end carries a coil D which has a vertically disposed axis and is movable up and down when the beam is oscillated. The coil D extends upward from the beam A into an annular channel e formed in the underside of a stationary permanent magnet E and surrounding a central polar portion ea of the magnet E. A pilot valve G of a known non-bleed type is subject to the control action of a nozzle assembly F which transmits a control pressure to the nozzle chamber g of the pilot valve or relay G.

The pressure in the output chamber ga of the pilot valve G is transmitted to and controls the adjustment of a main valve H. The latter is shown as a diaphragm valve having a control pressure chamber h to which the pressure in the pilot valve output chamber ga is transmitted. The expansion and contraction of the control chamber h impresses a feed back force on the beam A through a feed back connection including a spring I. As the nozzle chamber g of the pilot valve G expands and contracts, a second feed back force is transmitted to the beam A by a connection including a spring J between the pilot valve G and the beam A.

As shown, the pivot B comprises two flexible metallic strip elements 10 and 11 at right angles to one another. The strip 10 is vertically disposed and as shown has its upper end alongside and secured to a vertical side of a stationary mounting block 12. The lower end of the strip 10 is alongside and secured to a vertical side of a beam supporting member 13. As seen in end view in Fig. 1, the member 13 is rectangular in cross section, and has its flat under side resting on the flat upper side of the beam A, and is secured to the latter, as by the pivot fastening screws, adjacent its end to which the counterbalance C is attached. The strip 11 is horizontally disposed, and has one end alongside the bottom of the block 12, and is attached to the latter, and has its other end attached to the member 13. The axis of the pivot B is a horizontal line transverse to and intersecting each of the pivot strips 10 and 11.

As shown in Fig. 1, the counter-balance C is connected to the right end of the beam A by a bracket 14. The coil D is mounted on, and has its axis extending upward from the other end of the beam A. The terminals 15 of the coil are arranged for connection to a direct current signal source. The latter may be a thermocouple whose output is suitably amplified by a suitable amplifier. The magnitude of the electric current, transmitted to the coil D by the terminals 15, may vary, for example, between 3 and 15 milliamperes with the valve positioner responding to this to control the adjustment of the valve H. The stationary permanent magnet E co-acts with the coil D to subject the adjacent end of the beam A to an electro-magnetic attractive force which increases and decreases as the current flow through the coil D increases and decreases.

The nozzle assembly F, in the form shown in Fig. 1, comprises a horizontal flapper valve 16 above the upper side of the beam A and having one end attached to the latter, and comprises a vertical bleed nozzle 17 which is attached to the mounting block 12. The nozzle discharge is variably throttled by the flat upper side of the flapper 16. The nozzle has an inlet at its upper end which receives air from a conduit 18 through a restricted orifice 19. The conduit 18 is arranged to normally receive air from a source of air at an approximately constant pressure which may be 20 p. s. i. A conduit or branch pipe 20 having one end connected to the portion of the conduit 18 between the nozzle 17 and the restricted passage 19, transmits the nozzle pressure to the input or nozzle chamber g of the pilot valve G.

In the conventional form shown, the relay or non-bleed pilot valve G comprises a stationary casing having a cylindrical body wall 21, rigid upper and lower end walls 22 and 23 respectively, and intermediate partition walls 24, 25, and 26. The walls 24 and 26 are flexible, but the wall 25 is rigid. The areas of the walls 24 and 26 are shown to be the same; however, for pressure amplification, the respective areas may be changed. The chamber g is between the walls 22 and 24. The chamber ga is between the walls 25 and 26, and a constant pressure chamber gb is between the walls 25 and 23. The chamber gb is connected to a source of air under pressure by a conduit 18a which may be a branch of the supply conduit 18. The flexible walls 24 and 25 are at the upper and lower sides of a chamber Atm. which is in communication with the atmosphere through ports 27 in the wall 21. The flexible walls 24 and 26 have their central portions rigidly connected to the upper end and an intermediate portion, respectively, of a stem element 28 of circular cross section. The upper end portion of the stem 28 is solid, but the remainder of the stem is tubular and is formed with one or more lateral ports 29 which connect the bore of the stem 28 to the space Atm. The wall 25 is formed with a central aperture larger in diameter than the stem 28 and is normally closed by a valve 30. The latter is of spherical form and is normally held in its closed position by a spring 31 acting between the underside of the valve 30 and the bottom wall 23 of the relay.

In the normal balanced condition of the relay or pilot valve G, the pressure conditions in the chambers g, ga and gb are such that the valve 30 closes the orifice in the partition wall 26, and the lower end of the stem 28 engages the valve 30 and prevents the outflow of air from the chamber ga to the atmosphere through the bore of the stem 28, ports 29 and ports 27. When such stable operating conditions are interrupted by an increase or a decrease in the nozzle pressure transmitted to the relay chamber g by the pipe 20, the chamber g will expand or contract. The expansion of the chamber g depresses the flexible wall 24 and causes the stem 28 to depress the valve 30 and thereby permit air to pass from the chamber gb into the chamber ga and thus increase the pressure in the last mentioned chamber. That pressure increase tends to increase the pressure in the chamber ga sufficiently to move the flexible wall 24 back to its normal position and to permit the valve 30 to close the orifice in the wall 26.

The increase in the pressure in the chamber ga also produces a corresponding increase in the pressure transmitted to the chamber h. That pressure increase actuates a regulator or control valve Hb in the direction tending to decrease the nozzle pressure and to re-establish the normal operating conditions. When the pressure in the chamber g decreases, the flexible partition elements 24 and 26 and the stem 28 all move upward. The resultant movement of the stem 28 away from the valve 30 reduces the pressure in the chambers ga, and h.

The main valve H, as shown, is of conventional type having a central stem Ha which is connected at its upper end to the central portion of the flexible diaphragm h' which forms the movable bottom wall of the chamber h. The upper wall of that chamber is rigid and is connected at its periphery to a rigid casing element 35 including a yoke portion 36 which connects the rigid wall portion of the chamber h to the body of the regulator or control valve Hb. The latter includes a valve element, not shown, which is connected to and adjusted by the longitudinal movements of the stem Ha produced by pressure variations in the chamber h. The valve Hb may serve various purposes. For example, it may control the supply of fluid fuel to a combustion heater L having a temperature responsive thermocouple La which generates the electrical current which is amplified and supplied to the terminals 15 of the coil B. The main or ultimate control valve H, insofar as it has been described, may be of conventional form and include nothing claimed as novel herein.

The apparatus shown in Fig. 1 is theoretically capable of operating in the general manner described without the use of the feed back arrangements including the springs I and J. However, the use of those feed back arrangements and particularly the arrangement including the spring J is practically essential to the attainment of a desirably high stabilization of the action of the valve H. The feed back arrangement including the spring I shown in Fig. 1 comprises an adjustable compound lever mechanism including a primary lever or beam 40 and a follow-up beam or lever 41. The lever 40 has one end pivotally connected to the valve stem Ha and has its opposite ends pivotally connected to a stationary abutment or support 42. Intermediate its ends, the lever 40 is connected by a pivot element 43 to the lever 41. The latter has one end pivotally connected to a support 44 which may be similar to the support 42. The axis of the pivotal connection between the lever 40 and support 42 is parallel to, but laterally displaced from the axis of the pivotal connection between the lever 41 and the support 44. The end of the lever 41 remote from the support 44 is connected to a portion of the beam A adjacent the coil D by a yielding connection including the tension spring I and end connections 46 which may be wires. As shown, the pivot 43 extends through a longitudinal slot 45 formed in the lever 40 and may be clamped in any desired position along the length of the slot 45 by means of a clamping element 43a. The pivot 43 bears against the upper side of the lever 41, and its adjustment along the slot 45 varies the leverage with which the movable valve stem Ha acts on the beam A. The arrangement just described is characterized by its extreme stability and by the elimination of feed back from the stabilizing member when a balance position has been reached.

In the second feed back connection, shown diagrammatically in Fig. 1, the lower end of the spring J is attached to the valve stem 28 of the pilot valve G, and the upper end of the spring is connected to the beam A at a point horizontally intermediate the beam pivot B and the beam connection to the spring I. As shown, the lower end of the spring J is connected to the stem 28 by a harness element or yoke K. The lower portion of the yoke K extends into the chamber Atm and has an enlarged end portion 53 which is rigidly connected to the stem 28.

In the contemplated normal operation of the embodiment of the invention illustrated by way of example in Fig. 1, an increase or decrease in the current flowing through the coil D increases or decreases the attractive force acting between the stationary magnet E and the coil D and thereby respectively produces an up movement or a down movement of the end of the beam A on which the coil D is mounted. The up or down movement of the coil D results in a corresponding up or down movement of the flapper valve 16 carried by the beam A. When the valve 16 is moved up toward the stationary nozzle 17, the increased nozzle pressure is transmitted by the pipe 20 to the chamber g of the non-bleed type pilot valve or relay G. The immediate effect of an increase in the pressure in the chamber g is a downward movement of the pilot stem 28 and valve 30 with the result of the flow of air from the chamber gb into the chamber *ga*, and the transmission of the increased pressure in the chamber *gb* through the pipe 33 to the chamber *h* of the main valve H. The pressure increase in the chamber *h* depresses the diaphragm *h'* and lowers the valve element of the valve H*b* accordingly. Conversely when the flapper valve 16 is moved downward, the pressures in the chambers *g* and *h* are reduced, and the valve element of the valve H*b* is raised.

If, as may be assumed, the valve H*b* controls the supply of fuel to the heater L and the thermocouple L*a* responsive to the heater temperature is the initial source of current flowing through the coil D, a change in the current flow produced by an adjustment of the valve H*b* will vary the angular position of the beam A. The beam movement will create a valve operation which will produce a negative feed back effect on the beam. A feed back adjustment on the beam will be created by the adjustments of the valve position responsing beam 41 and spring I, and by adjustments of the pilot valve flow stem 28, harness K and spring J. While the adjustment of the valve H effects simultaneous adjustments in the valve H*b* and the lever 41, the effects on the beam A of an adjustment of the valve H*b* on the resultant current flow through coil D will not necessarily be synchronous due to the time lag of the process. However, the force from the coil D will be balanced by the forces due to springs I and J and the beam will come to a stabilized position which will be dependent upon the input force from the coil D. The force from the spring J will be present only so long as air is being supplied to or exhausted from the valve H.

The feed back action or force effected through the yoke K and spring J is directly responsive to the movement of the stem element 28, while the feed back action by the means including the spring I is a direct result of the transmission of pressure from the pilot valve chamber *ga* to the chambers *h* of the regulator H. The timing of the two feed back actions are different and their magnitudes are differently related to the variations in the pressure in the bleed pressure transmitted to the chamber *g*. The different feed back actions attainable as has been described, cooperate to effect a highly desirable control of the operating pressure transmitted to the valve H.

Since the valve H may have a high time response and contain appreciable mass, once it is put in motion, it tends to stay that way. If the controller for the valve H were to supply an actuating pressure thereto until the valve motion above, acting through spring I, balanced beam A, the valve would tend to continue to move past the balanced condition and cause overshooting or hunting. As the valve H motion is directly related to the positioning of the pilot relay stem 28, the amount and rate of movement of the valve H may be anticipated by the motion of the stem 28. Thus, the stem 28 position which is fed back to beam A may serve to provide a force to balance the beam A prior to the time that the beam would be balanced by the action of the spring I alone. By proper selection of the constants in the apparatus, the valve H may be caused to move directly to the desired position without any overshoot or hunting.

Fig. 2 illustrates a modification including means for magnifying the negative feed back action of the relay stem 28. With the arrangement shown in Fig. 2, the feed back force impressed on the main beam A by the movement of the relay stem 28 is transmitted through the harness member K and an uprising metal strip 50 to the short end of a lever 51. That lever is pivotally supported by a flexible, vertically disposed metal strip 52. The latter has its upper end fastened to the mounting block 12 and has its lower end attached to the lever 51. The oscillatory movement of the long end of the lever subjects the beam A to a feed back force by means comprising a hook 53 connected to the long end of the lever 51 and acting on the beam A through the element 13 and a leaf spring 54 having one end attached to the member 13 and extending longitudinally of the beam A. The leaf spring 54 provides a spring action analogous to that provided by the spring J of Fig. 1. In practice the arrangement shown in Fig. 2 permits of a motion multiplication which may well be as great as 3½ to 1, which is quite desirable in some uses of the invention.

To enable the harness element K to act symmetrically on the strip 50 to avoid any tendency to tilt the stem 28, the lower end of the strip 50 is advantageously connected to the top portion of the harness element K for adjustment of the lower end of the member 50 longitudinally of the top portion of the element K. To effect such adjustment the lower end of the strip 50 may be connected to the top member of the member K between clamping elements 55 threaded on the top member portion of the member K.

Fig. 3 diagrammatically illustrates a modification in which the pilot valve mechanism subjects a beam A supported by a pivot 60 to a feed back action effected by a mechanical connection between the pilot valve stem 28 and a vertically movable bleed nozzle 17*a*. As shown, the nozzle 17*a* is moved up and down by a lever 61 having one end connected to the nozzle and having its other end connected to the pilot valve stem 28 through a yoke K and mounted to turn about a horizontal pivot 62 intermediate the ends of the lever. With the arrangement shown in Fig. 3, the up and down movements of the pilot valve stem 28 and member K operate to give the nozzle 17*a* down and up movements, respectively, and thereby subject the positioner to a position feed back action. This position feedback of the nozzle 17*a* relative to the flapper 61*a* provides the added stabilizing feedback accomplished by the spring J of Figure 1. It will be readily apparent that the input deflecting force on the beam A from the coil D, shown in Figure 1, will cause a normal deflection of the nozzle 61A relative to the nozzle 17*a* so as to produce a varying nozzle back pressure which may be used for control purposes. The beam A is also subjected to force feed back action by mechanism of the type including the spring I shown in Fig. 1.

Fig. 4 illustrates another modification operative to subject a beam A mounted as shown in Fig. 3 to force feed back and position feed back actions similar in character to those obtained with the apparatus shown in Fig. 3. In Fig. 4 the position feed back action is effected through a flexible flapper valve 63. The latter has one end rigidly connected to a yoke member K to move the flapper valve 63 away from and toward a stationary nozzle 17 as the pilot valve stem 28 is moved down and up, and thereby provides position feed back actions. In Fig. 4 the beam A supports a hook 64 secured to the beam A and which is arranged to bear against and depress the free end of the flapper valve 63 as the beam A turns counter-clockwise about its pivot 60. This latter action produces the normal flapper-nozzle adjustment and causes the nozzle back pressure to change. The position feedback to the right end of the flapper 63 moves the flapper relative to the nozzle to provide the stabilizing feedback accomplished by the spring J in Figure 1.

While, in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In a control mechanism of the character described having a variable bleed for governing the operating pressure in the system by which the magnitude of a condition is governed, primary mechanism for varying said bleed responsively to the magnitude of said condition, and a plurality of means responsive to changes in said operating pressure for stabilizing the latter; the improvement in which said means comprises a non-bleed pilot valve having first and second, normally balanced, pressure chambers each having a movable wall, an element connecting said walls for compressing each chamber on a decrease in the pressure in that chamber relative to the pressure in the other, conduit means for transmitting the bleed pressure to said first chamber, means for passing air under pressure into and for discharging air from said second chamber as required to rebalance said chambers following an increase or decrease respectively in the bleed pressure transmitted to the first chamber, a regulator responsive to the pressure in said second chamber including feedback means for stabilizing said operating pressure, and means actuated by the movement of said element to provide a further feedback to stabilize said operating pressure.

2. An improvement as specified in claim 1, in which the primary mechanism includes means which tends to move an oscillating member in one direction and in which each of said means for stabilizing said operating pressure is arranged to apply a force to said oscillating member tending to move the latter in a direction opposite to the first mentioned direction.

3. An improvement as specified in claim 2, in which said bleed pressure is controlled by the relative positions of nozzle and flapper valve elements and in which one of the last mentioned elements is stationary and including means arranged to move the other of said elements and in accordance with the movements of said oscillating member.

4. An improvement as specified in claim 1, in which nozzle and flapper valve elements co-operate by their relative movements to vary the bleed pressure and in which one of said elements is given movement by said regulator and the other of said elements is given movements by said wall connecting element.

5. Control apparatus comprising an element movable back and forth along a predetermined path, means for impressing a variable force on said element tending to move the latter along said path in one direction, a flapper and nozzle unit for maintaining a nozzle pressure varying on and in accordance with variations in the position of said element, a non-bleed pilot valve having first and second normally balanced expansible pressure chambers each having a flexible wall, a connector connecting said flexible walls for simultaneous movement, conduit means for transmitting said nozzle pressure to said first chamber, a regulator, conduit means for transmitting the pressure in said second expansible chamber to said regulator, and means actuated by said connector to supply air under pressure to, and discharge air from said second chamber as required to rebalance said chambers when unbalanced by the expansion of one and the compression of the other of said chambers, means actuated by said regulator to subject said element to a force opposing the action of the first mentioned force on said element, and means connected to said connector for subjecting said element to a feedback action following each change in said nozzle pressure.

6. A pneumatic device positioner comprising, a movable member arranged to have applied thereto a force proportional to the magnitude of a variable, pneumatic means mounted with respect to said member to produce a pneumatic pressure proportional to the movement of said member, a self-balancing pneumatic pilot valve connected to the output of said pneumatic means to produce a control pressure proportional to the pressure received from said pneumatic means with said control pressure being adapted to position the pneumatic device, said pilot valve having a movable valve stem, means responsive to the motion of the pneumatic device for producing a balancing feed back force on said movable member proportional to the movement of the device, and means responsive to a motion of said movable valve stem in said pneumatic pilot valve for producing a second feed back balancing force on said movable member, said means comprising a yoke member attached to said movable valve stem and a resilient means for converting the motion of said stem into a force proportional to the motion of said stem.

7. Apparatus as defined in claim 6 wherein said yoke includes means for centering the output connection of said resilient means so that said yoke will not interfere with the action of said stem.

References Cited in the file of this patent
UNITED STATES PATENTS

| | | |
|---|---|---|
| 2,106,036 | O'Connor | Jan. 18, 1938 |
| 2,220,180 | Spitzglass | Nov. 5, 1940 |
| 2,298,112 | Edwards | Oct. 6, 1942 |
| 2,503,447 | May | Apr. 11, 1950 |
| 2,543,120 | McLeod | Feb. 27, 1951 |
| 2,667,860 | Henderson | Feb. 2, 1954 |
| 2,668,556 | Meyer | Feb. 9, 1954 |
| 2,706,466 | Rosenberger | Apr. 19, 1955 |